F. E. SPENCER.
DRAFT EQUALIZER.
APPLICATION FILED FEB. 13, 1912.
1,026,130.
Patented May 14, 1912.
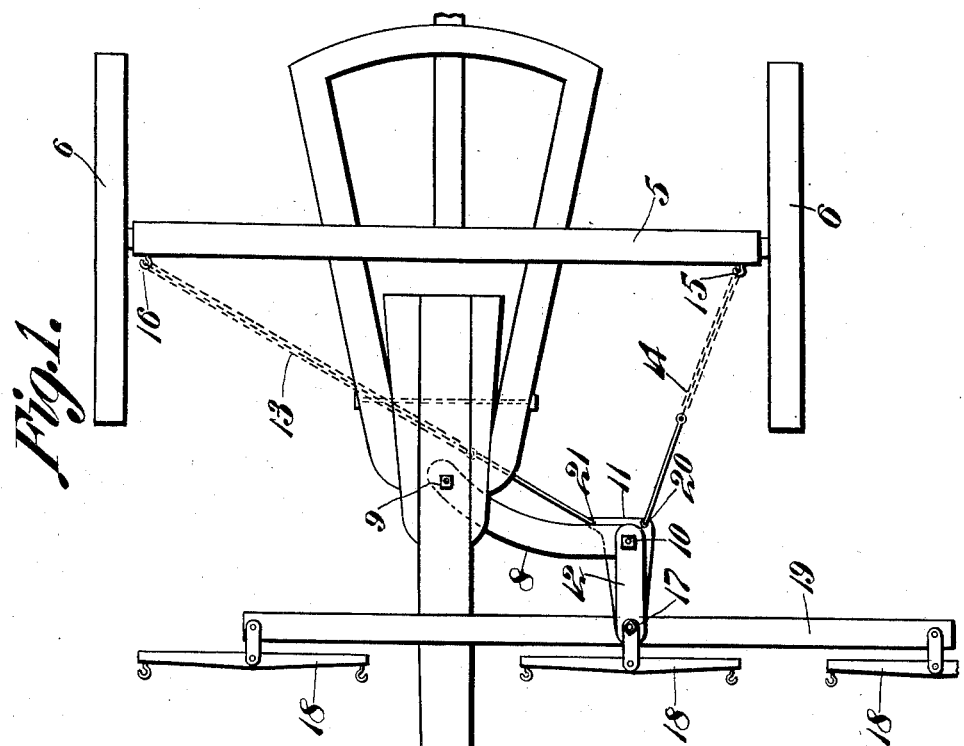
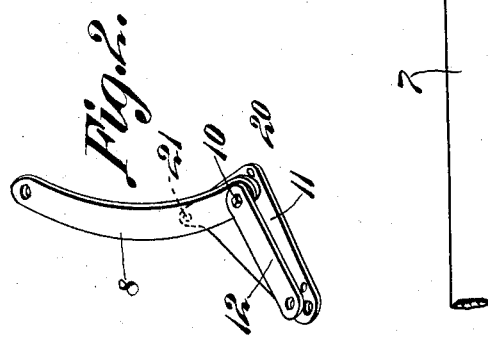
Witnesses
Francis E. Spencer,
Inventor
by C. A. Snow & Co.,
Attorneys

UNITED STATES PATENT OFFICE.

FRANCIS E. SPENCER, OF DOVER, OKLAHOMA, ASSIGNOR OF ONE-HALF TO SCOTT GILCHRIST, OF KIEL, OKLAHOMA.

DRAFT-EQUALIZER.

1,026,130.  Specification of Letters Patent.  Patented May 14, 1912.

Application filed February 13, 1912. Serial No. 677,351.

*To all whom it may concern:*

Be it known that I, FRANCIS E. SPENCER, a citizen of the United States, residing at Dover, in the county of Kingfisher and State of Oklahoma, have invented a new and useful Draft-Equalizer, of which the following is a specification.

This invention relates to draft equalizers, and has for its object to provide a device of this character adapted to compensate for the side draft of vehicles and wheel-mounted tilling devices, such as riding cultivators, and the like, or, to provide means for producing a draft at the two sides of the vehicle commensurate with the pull required at the respective sides of the vehicle to move same.

This invention also contemplates a draft equalizer of this character which shall permit the vehicle to be readily steered or turned, and which is simple in construction, practical and efficient.

To the above ends, the invention is embodied generally in a lateral arm pivoted to the tongue attached to the steering axle of the vehicle, a plate pivoted to the said arm, draft cables connecting the said plate and the extremities of the axle, and a whiffletree connected to the said plate for the attachment of a plurality of draft animals.

The invention is illustrated in the accompanying drawings, wherein similar reference characters indicate similar parts.

Figure 1 is a plan view of the invention as applied to the steering axle and tongue of a vehicle. Fig. 2 is a perspective view of the lateral arm and the attached parts.

Referring in detail to the drawings, the steering axle of the vehicle is designated by the numeral 5 which has the ground wheel 6 mounted on the extremities thereof, and the usual tongue 7 is connected to the axle 5. A lateral arcuate arm 8 is pivoted adjacent the rear end of the tongue 7 by means of a bolt 9, and the said arm extends toward the side requiring the greatest amount of draft, or toward the side having the greatest resistance. A triangular plate 11 is pivoted to the free end of the arm 8 by means of the bolt 10, the said plate being pivoted on the lower side of the arm 8, and a whiffletree or tripletree 19 is connected or attached to the forward end or to one of the corners of the plate 11, by means of a bolt 17 or other means. The plate 11 is connected to the whiffletree 19 on its lower side, and a link 12 connects the bolts 10 and 17 and rests upon the upper side of the arm 8 and the whiffletree or tripletree 19. The other corners of the plate 11 are disposed in rear of the pivotal point of the plate and at the respective sides of the said pivotal point, the said corners having the respective apertures 20 and 21 therein. Hooks 15 and 16, respectively, are secured to the extremities of the axle 5, and the respective draft cables or chains 14 and 13 are connected at one end with the apertures 20 and 21, and at the other end with the hooks 15 and 16. The cables or chains 14 and 13 being engaged at their rear ends to the respective hooks 15 and 16, permit the said cables or chains to be adjusted whereby the arm 8 may be swung upon its pivot to swing the plate 11 to or from the tongue 7. The whiffletree or tripletree 19 carries the singletrees 18 for the attachment of the draft animals.

In use, the draft transmitted to the whiffletree or tripletree 19 by the draft animals will pull the plate 11 forwardly, whereby the arm 8 will swing on its pivot to draw the draft cables or chains 14 and 13 taut, in which event the steering axle will be drawn forwardly to move the vehicle. The arm 8 being disposed laterally and toward the side requiring the greatest draft, will cause the center of draft to lie approximately in line with the pivotal point or bolt 10 of the plate 11. Therefore, by adjusting the lengths of the cables or chains 14 and 13, the arm 8 may be swung relative to the tongue 7 to properly position the plate 11, and in this manner the side draft of the vehicle or wheel-mounted tilling device may be overcome, or a draft may be produced at the two sides of the vehicle commensurate with the pull required at the respective sides of the vehicle.

When the draft animals move to one side or the other to steer or turn the vehicle, the whiffletree or tripletree 19 will be swung which will cause the plate 11 to be swung upon the bolt 10 and the corresponding draft cable or chain will be brought under a correspondingly greater tension, while the other draft cable or chain will be slacked, thereby causing the steering axle to be swung to turn the vehicle. This steering or turning of the vehicle is also assisted by the arm 8 which connects the plate 11 with the tongue 7, as will be understood. This device will therefore not only proportionately distribute the draft to the respective sides of the vehicle, but will also permit the vehicle to be readily steered or turned, and this device is simple in its construction, as well as practical and efficient in its use.

Having described the invention, what is claimed as new is:

1. In combination with the steering axle of a vehicle and the tongue secured thereto, of a lateral arm pivoted to the tongue, a member pivoted to the arm, draft cables connecting the said member at points at each side of the pivotal point with the corresponding extremities of the axle, and a whiffletree connected to the said member.

2. In combination with the steering axle of a vehicle and the tongue secured thereto, of a lateral arm pivoted to the tongue, a triangular plate pivoted to the said arm, a pair of draft cables adjustably connecting two corners of the said plate with the corresponding extremities of the axle, and a whiffletree connected to the other corner of the said plate.

In testimony that I claim the foregoing as my own, I have hereto affixed my signature in the presence of two witnesses.

FRANCIS E. SPENCER.

Witnesses:
M. A. MITCHELL,
GOLDY SMITH.

Copies of this patent may be obtained for five cents each, by addressing the "Commissioner of Patents, Washington, D. C."